United States Patent [19]

Cussot et al.

[11] Patent Number: 4,920,002
[45] Date of Patent: Apr. 24, 1990

[54] COLORED AND WEAR-RESISTANT DECORATIVE COATING BASED ON EPOXY RESIN AND FOR USE ON FLOORS AND ON PANELS, AND METHOD OF OBTAINING IT

[75] Inventors: Christian Cussot, Cleres; Jean-Didier Delage, Sartrouville, both of France

[73] Assignee: Societe Francaise Bitumastic, Petit Quevilly, France

[21] Appl. No.: 210,835

[22] Filed: Jun. 24, 1988

[30] Foreign Application Priority Data

Jun. 26, 1987 [FR] France ................................ 87 09016

[51] Int. Cl.$^5$ ............................................ B32B 18/00
[52] U.S. Cl. ..................... 428/325; 428/220; 428/413; 523/223; 523/440
[58] Field of Search ................ 428/325, 413; 523/223, 523/440; 524/914

[56] References Cited

U.S. PATENT DOCUMENTS 3,928,703 12/1975 Cook .................................. 428/325
4,131,571 12/1978 Crawley et al. .................... 428/325

FOREIGN PATENT DOCUMENTS 2731390 1/1979 Fed. Rep. of Germany ...... 523/440

*Primary Examiner*—Lewis T. Jacobs
*Attorney, Agent, or Firm*—Amster, Rothstein & Ebenstein

[57] ABSTRACT

The coating is constituted by a uniform mixture of solvent-free epoxy resin containing the usual additives, solid glass microbeads, and pigment-colored aluminum flakes, said coating thus being pigmented in its bulk, translucent, and glittering in durable manner. The flakes are advantageously colored using a colored and irridescent epoxy varnish. The coating is suitable for application in a single coat and the single coat may be from 1 mm to 5 mm thick. It is obtained by spreading the uniform mixture of the various components on a key-providing undercoat which is initially applied to the surface to be coated. The mixture is obtained by using premeasured quantities.

11 Claims, No Drawings

COLORED AND WEAR-RESISTANT DECORATIVE COATING BASED ON EPOXY RESIN AND FOR USE ON FLOORS AND ON PANELS, AND METHOD OF OBTAINING IT

BACKGROUND OF THE INVENTION

There already exist wear-resistant floor coatings based on epoxy resin and constituted by conventional opaque fillers (in particular quartz and silicas) embedded in an epoxy binder and colored by ground-up pigments or by a colored epoxy paste. These conventional coatings are applied in a single coat, are self-smoothing, have a single color which is uniform, and which has a finish which, when new, is semi-gloss (satin), unless it contains a matting agent. Although such a coating may initially be shiny, it subsequently becomes matt by being scratched in use. Its surface may be smooth or structured (if the coating is to be a non-slip coating).

The use of an epoxy resin in a coating provides several advantages: this resin has remarkable chemical inertness and mechanical strength (a hardness of 2 on the Gardner scale), its flammability is low (classification M1 in the building materials fire classification scale of the (French) Scientific and Technical Center for the Construction Industry); when it does burn, it does not give off toxic vapors; it is translucent; and its natural pale amber color allows all sorts of tinting. Some polyurethane resins are hard, translucent, and pale, but they are sensitive to damp (they react with the water contained in the concrete or cement on which they are laid, and the reaction gives off carbon dioxide gas, thereby forming unsightly bubbles in the coating and reducing its adherence). In addition they are flammable (classification M2 or M3) and when they burn they give off highly toxic hydrocyanic acid. The use of epoxy resins is therefore preferred.

There also exist colored decorative coatings based on epoxy resin and grains of colored quartz, known as "Quartzcolor". These grains are relatively large in diameter, they are heavy, and if they are mixed in bulk with the resin they settle out, thereby giving a varying surface appearance to the coating since the thickness of the coating, in particular on concrete, is irregular due to the fact that the surface of a concrete support is not plane, even after it has been prepared. The current technique therefore consists in laying five successive thin coats of epoxy binder on the concrete with each coat having said grains of quartz dusted over it. The coats are applied at one-day intervals. Overall application therefore takes five days. The total thickness of the resulting coating is 1 mm to 1.5 mm. It suffers from the risk of the coats coming unstuck since their adhesion is purely physical, and as a result its resistance to mechanical shock is poor. The grains of quartz may be replaced by flakes of colored polyester. The coating is laid using the same technique, and suffers from the same drawbacks.

Other decorative coatings having a thickness of 1 mm to 2 mm, are laid in a single coat using a mixture of pigment in non-filled epoxy resin (which makes application difficult to control), however the pigments settle out and, on a support with a non-uniform surface (such as concrete), the coating has some zones which are properly pigmented and other zones over depressions in the surface of the concrete which are only slightly colored, thus giving rise to an unsightly appearance after the epoxy binder has polymerized.

The object of the present invention is to remedy the above-mentioned drawbacks of prior coatings by providing a new colored decorative coating which withstands wear, and which, in addition, is both translucent and glittering, which characteristics are maintained during use of the coating, and are not to be found in prior coatings.

SUMMARY OF THE INVENTION

The object of the invention is achieved by means of an epoxy resin based coating suitable for application to floors and panels, wherein the resin is constituted by a uniform mixture of solvent-free epoxy resin containing the usual additives, together with solid glass microbeads and pigment-colored aluminum flakes, said coating thus being bulk-pigmented, translucent, and glittering in a durable manner.

This coating is suitable for application to any substrate made of a rigid material: concrete, mortar, cement, fibrocement, tiles, wood, plywood, fiberboard, plastics, heavy cardboard, and the like. It is mainly intended for covering floors, however it may also be used to decorate panels for subsequent use in making walls or furniture.

The epoxy resin, comprising a hardener and a main component including various additives (oil for providing flexibility; surface-active agent for de-bubbling, for preventing foaming, for avoiding scratching, and for ensuring uniformity), may constitute 19% to 40% by weight of the coating, with the glass microbeads constituting 40% to 80% by weight, and the aluminum flakes 1% to 10% by weight.

The invention also provides the method of providing a coating as defined above.

MORE DETAILED DESCRIPTION

The fundamental component of the epoxy resin may be constituted, inter alia, by the substance sold under the trademark "Eurepox XE 764" by SCHERING (France) with the hardener being, for example, the substance sold under the trademark "Euredur XE 48" by the same company. The additives may be the wetting agent sold under the trademark "BORCHIGOL VL 73S" by BORCHERS (France) and the oil may be that manufactured and sold under the trademark "Sidepaline 10W" by GERLAND (France). The substance "Eurepox XE 764" (a polyepoxide resin containing a reactive thinner) has an epoxy equivalent weight of 185, a viscosity of 400 mP/s at 25° C., and a specific gravity of 1.13. The substance "Euredur XE 48" (cycloaliphatic amine adduct) has an epoxy equivalent weight of 75, a viscosity of 600 mP/s at 25° C., and a specific gravity of 1.04. Phenolic epoxy resins, and in particular a polyepoxide resin based on a bisphenol, and various reactive thinners thereof, are described in *Techniques De L'Ingenieur* 8-1981 in the monograph "Polyepoxides," Sections 1.1 and 1.2.

The solid glass microbeads may, for example, be of the type 50 100-A2 (FILLER M.B.V.3) sold by SOGEMET (France). Their size may vary, for example, from 2 microns to 1100 microns and various grain size distributions are possible with top and bottom limits lying within the above-mentioned non-limiting range of 2 microns to 1100 microns. Specific mention may be made of grain sizes lying between 75 microns and 106 microns or between 44 microns and 210 microns.

The aluminum flakes may have surface dimensions running from a few microns to a few millimeters and may be about 10 microns thick. They may, for example, be flakes manufactured and sold under the trademark "KINGSTON 1/64" by FIREFLAKE INC. (USA) having dimensions of 37 microns×37 microns and a thickness of 10 microns. They are coated with a colored and iridescent epoxy varnish, and they are available in a wide range of tints.

The product from which the coating is prepared and formed is presented to the user in the form of four separately packaged components: an epoxy base (the main component of the epoxy resin together with additives); a hardener for causing the resin to harden by cross-linking; a filler (glass microbeads); and a pigment (colored aluminum flakes). These four components are supplied in appropriate proportions in a common outer package (thus constituting a kit). By pre-formulating and pre-measuring the components in this way, the product is ready for use and on-site operating errors are avoided.

The coating is applied as follows: a substrate is suitably prepared by conventional methods (generally mechanical cleaning to ensure cleanness, planeness, and key). One or two key-providing undercoats are applied to the surface (using a mixture of epoxy resin such as that sold under the trademark "EPOXY LC" by Schering, together with a hardener) for the purpose, of imprisoning bubbles of air in the pores of the substrate (particularly concrete or the like), and then, while the primary coat is still tacky, the coating of the invention is applied after the mixture has been prepared as specified below. The hardener is poured into the epoxy base, and they are mixed to obtain a uniform paste constituting the binder of the coating; this binder is then poured into a resin mixer which is already running; the colored flakes (pigment) are added; then the microbeads are added (premixed and formulated filler); and mixing is continued for several minutes until a uniform mixture is obtained. The premeasured components of the mixture are added in optimum proportions. The resulting mortar is a creamy mass in which the microbeads and the flakes are uniformly distributed. It can thus be spread out in bands in a single coat on the key-providing undercoat, using a metal float or a scraper, and the thickness of the single coat can be adjusted, at will, to between 1 mm and 5 mm. The coating is self-levelling, self-debubbling and it spreads on its own. It is thus easy to apply and does not require a thinner, other than an epoxy resin solvent for cleaning the tools and the mixer at the end of the operation.

The resulting single-coat coating is thick smooth, free from join lines, odor-free, tight, hygienic (not poisonous if ingested), easy to clean, and withstands shock, pressure, mechanical abrasion (scratching), and chemical attack exceptionally well, while still retaining a degree of plasticity which makes it practically unbreakable, and thus durable. The coating has a particularly pleasing translucent, colored, and glittering appearance which is also durable, since the flakes are uniformly distributed throughout the thickness of the coating, thereby ensuring that the decorative effect is retained even if the coating is scratched or chemically attacked.

The solid glass microbeads do not weaken the hardness imparted to the coating by the epoxy resin, and they co-operate with the resin in order to give the coating its translucence and an appearance of depth, with their range of sizes and low apparent density ensuring that they are maintained in uniform suspension throughout the epoxy binder and also ensuring that the flakes which take up positions between the microbeads are also uniformly distributed throughout the thickness of the coating, thus ensuring that the glittering appearance is stable over time. The flakes contribute to the mechanical strength of the coating, and above all they give it its color and its glittering appearance. Further, the combination of glass microbead beads and colored aluminum flakes gives rise to multiple glass-metal reflections in the incident light, thereby increasing the desired glittering effect.

Colored aluminum flakes are expensive. Without the glass microbeads, a very much larger quantity would be required in the epoxy binder which would therefore be commercially too expensive. Further, since they are light, they would remain on the surface if there were no glass microbeads, and they would therefore be removed by wear so the glittering effects would not be durable. If glass microbeads were used on their own, they would need to be colored themselves and they would not provide a glittering effect. The combined use of microbeads and flakes in the epoxy binder is thus particularly advantageous.

The present coating is equally suitable for new or old, industrial or non-industrial floors, and in numerous fields (pharmaceutical industry, perfumery and beauty products, electronics, food industry, shops, hospitals) and in general for any decorative floor or area where it is desirable to have hardness, low maintenance, the possibility of decontamination, and an attractive appearance.

This coating could be applied to walls and ceilings if it were given an additive for suitably modifying its viscosity so as to prevent it from running and dripping while being spread out.

A particular example of the composition used and the resulting coating is given below, purely by way of non-limiting example.

The epoxy binder is a solvent-free resin, having low viscosity and high wetting power. The filler is inert and very hard. It is calibrated, pre-measured, and pre-mixed in such a manner as to ensure that the final coating has optimum compactness and a translucent appearance.

When mixed as described above, the components provide a semi-soft mortar which is self-smoothing, which has a specific gravity of 1.7 at 20° C., in which the binder ratio (base/hardener) is 100/40 by weight, and in which the mortar ratio (binder/filler is $\frac{1}{2}$ by weight. The dry extract is 100% by weight at ambient temperature.

It can be applied at temperatures lying between 5° C. and 25° C. The mortar is applied on a key-providing undercoat, in a single coat having a thickness of 3 mm, for example, (using 1.7 kg/m$^2$ per mm of thickness, i.e. 5.1 kg/m$^2$ for a thickness of 3 mm). It remains usable for 45 min at 20° C. and for 15 min at 30° C. The coating begins to harden after 24 hours and it is fully cross-linked after seven days. Once dry, its appearance is smooth, translucent, and glittering. It can then be used in temperatures lying in the range −40° C. to +80° C. It has the following properties:

compression strength: 600 kg/cm$^2$
bending strength: 160 kg/cm$^2$
tensile strength: 220 kg/cm$^2$
shock resistance: 7 kg/m
wear resistance: Amsler 1.5μ after 3,000 cycles
chemical resistance: Polymerized samples immersed at 20° C. for 12 months in various strong acids or strong bases have withstood 80% of the acids and bases tested.

Detail modifications using technical equivalence may be applied to the above-described method and coating, without thereby going beyond the scope of the present invention.

| EXAMPLE | FORMULA of the composition used | | | |
|---|---|---|---|---|
| Component A. Base: | | | | |
| TYPE XE 764 = SCHERING | 8.888 kg (98.75%) | | | |
| TYPE SIDEPALAINE 10W = GERLAND | 0.022 kg (0.25%) = | 9 kg (72%) | | |
| TYPE BORCHIGOL VL 73 S = BORCHERS | 0.090 kg (1%) | | (Epoxy binder) = 12.5 kg (32.45%) in cans | |
| Component B. Hardener: | | | | |
| TYPE XE 48 = SCHERING | | 3.5 kg (28%) | | COMPLETE KIT 38.5 kg (100%) |
| Component C. Fill: | | | | |
| Glass microbeads (44 microns to 220 microns) TYPE: 50100-A2 = (FILLER M.B.V.3) SOGEMET | | | 25 kg (64.85%) (in a bag) | |
| Component D. Pigment: | | | | |
| TYPE KINGSTON 1/64 = FIREFLAKE INC. (aluminum particles coated in colored and irridescent epoxy varnish) | | | 1 kg (2.6%) (in a jar) | |

What we claim is:

1. A colored, wear-resistant, decorative coating based on epoxy resin applied to a substrate, wherein the coating is constituted by a uniform mixture including solvent-free epoxy resin, solid glass microbeads and pigment-colored aluminum flakes, said coating thus being bulk-pigmented, translucent, and glittering in a durable manner.

2. A coating according to claim 1, wherein the solvent-free epoxy resin comprises the reaction product of a hardener component and a main component, which components together constitute the epoxy binder and represent 19% to 40% of the total weight of the coating, with the solid microbeads representing 40% to 80% of said weight, and with the colored aluminum flakes representing 1% to 10% of said weight.

3. A coating according to claim 1, wherein the grain size distribution of the solid glass microbeads varies between 2 microns and 1100 microns.

4. A coating according to claim 1, wherein the colored aluminum flakes have surface dimensions which lie in the range of microns to millimeters and have a thickness of about 10 microns.

5. A coating according to claim 4, wherein the colored aluminum flakes have surface dimensions of 37 microns×37 microns and a thickness of 10 microns.

6. A coating according to claim 1, wherein the aluminum flakes are colored by virtue of being coated with a colored and iridescent epoxy varnish.

7. A coating according to claim 1, applied in the form of a single coat.

8. A coating according to claim 7, wherein the thickness of the single coat lies in the range 1 millimeter to 5 millimeters.

9. A coating according to claim 2, constituted, by weight, by 32.45% epoxy binder, 64.95% solid glass microbeads, and 2.6% aluminum flakes coated with colored and iridescent epoxy varnish, the epoxy binder being constituted, by weight, by 72% base resin containing additives and 28% hardener, the glass microbeads having grain sizes in the range 44 microns to 210 microns, and the aluminum flakes having surface dimensions of 37 microns×37 microns and a thickness of 10 microns.

10. A coating according to claim 1, wherein the substrate is a floor or panel.

11. A coating according to claim 1 wherein the weight of the colored aluminum flakes does not exceed that of the epoxy binder, and the weight of the epoxy binder does not exceed that of the solid microbeads.

* * * * *